(12) United States Patent
Hill et al.

(10) Patent No.: US 8,740,395 B2
(45) Date of Patent: Jun. 3, 2014

(54) PROJECTION UNIT AND METHOD OF CONTROLLING A FIRST LIGHT SOURCE AND A SECOND LIGHT SOURCE

(75) Inventors: Douglas Blair Hill, Calgary (CA); Jackson Chan, Calgary (CA)

(73) Assignee: SMART Technologies ULC (CA)

( * ) Notice: Subject to any disclaimer, the term of this patent is extended or adjusted under 35 U.S.C. 154(b) by 427 days.

(21) Appl. No.: 13/078,758

(22) Filed: Apr. 1, 2011

(65) Prior Publication Data
US 2012/0249410 A1 Oct. 4, 2012

(51) Int. Cl.
G03B 21/26 (2006.01)

(52) U.S. Cl.
USPC ............ 353/94; 353/31; 353/39; 353/42; 353/43; 353/85; 345/156; 362/227; 362/230

(58) Field of Classification Search
USPC ............ 353/31, 119, 120, 43, 39, 42, 85, 94, 353/121, 122; 348/630, 631, 744–747; 362/227, 230, 231, 235, 249.02, 293, 362/800; 349/5, 7–9; 345/156
See application file for complete search history.

(56) References Cited

U.S. PATENT DOCUMENTS

| | | | |
|---|---|---|---|
| 5,448,263 A | 9/1995 | Martin | |
| 6,109,752 A | 8/2000 | Itoh et al. | |
| 6,141,000 A | 10/2000 | Martin | |
| 6,337,681 B1 | 1/2002 | Martin | |
| 6,467,911 B1 | 10/2002 | Ueyama et al. | |
| 6,540,366 B2 | 4/2003 | Keenan et al. | |
| 6,747,636 B2 | 6/2004 | Martin | |
| 6,803,906 B1 | 10/2004 | Morrison et al. | |
| 6,840,627 B2 * | 1/2005 | Olbrich | 353/42 |
| 7,188,958 B2 * | 3/2007 | Zoidis et al. | 353/119 |
| 7,232,986 B2 | 6/2007 | Worthington et al. | |
| 7,236,162 B2 | 6/2007 | Morrison et al. | |
| 7,244,032 B2 | 7/2007 | Inamoto | |
| 7,274,356 B2 | 9/2007 | Ung et al. | |
| 7,532,206 B2 | 5/2009 | Morrison et al. | |
| 8,075,142 B2 * | 12/2011 | Hirata et al. | 353/79 |
| 2005/0013132 A1 * | 1/2005 | Kim et al. | 362/231 |
| 2006/0274289 A1 * | 12/2006 | Chen et al. | 353/119 |
| 2009/0154153 A1 | 6/2009 | Lin | |
| 2010/0079409 A1 | 4/2010 | Sirotich et al. | |
| 2011/0050611 A1 | 3/2011 | Pearce | |
| 2011/0169736 A1 | 7/2011 | Bolt et al. | |

FOREIGN PATENT DOCUMENTS

WO 2010/143891 A2 12/2010

OTHER PUBLICATIONS

Transmittal; International Search Report; and the Written Opinion of the International Searching Authority for International Application No. PCT/CA2012/000255 with a mailing date of Jul. 10, 2012.

* cited by examiner

Primary Examiner — Sultan Chowdhury
(74) Attorney, Agent, or Firm — Katten Muchin Rosenman LLP

(57) ABSTRACT

A projection unit comprises a first light source outputting light that is used to project an image during normal projection unit use, and a second light source outputting light of a different intensity that is used to project an image outside of normal projection unit use.

37 Claims, 14 Drawing Sheets

PROJECTION UNIT AND METHOD OF CONTROLLING A FIRST LIGHT SOURCE AND A SECOND LIGHT SOURCE

FIELD OF THE INVENTION

The present invention relates to a projection unit and a method of controlling the same.

BACKGROUND OF THE INVENTION

Interactive input systems that allow users to inject input (e.g., digital ink, mouse events, etc.) into an application program using an active pointer (e.g., a pointer that emits light, sound or other signal), a passive pointer (e.g., a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and 7,532,206, all assigned to SMART Technologies ULC of Calgary, Alberta, Canada, assignee of the subject application, the entire contents of which are incorporated herein by reference; touch systems comprising touch panels employing electromagnetic, capacitive, acoustic or other technologies to register pointer input; tablet and laptop personal computers (PCs); personal digital assistants (PDAs) and other handheld devices; and other similar devices.

In some interactive input systems, conventional projection units are employed to project a computer-generated image onto a display or interactive surface. For example, U.S. Pat. No. 6,540,366 to Keenan, et al., assigned to SMART Technologies ULC, discloses an overhead projection system comprising an overhead projector support assembly extending generally horizontally from a generally vertical support surface. A touch-sensitive display screen having a display surface is mounted on the support surface beneath the projector support assembly. A projector is mounted on the projector support assembly adjacent its distal end and is aimed to project images onto the display surface of the touch-sensitive display screen. The touch-sensitive display screen outputs control signals in response to contacts made thereon. The control signals are then conveyed to a personal computer, which uses the control signals to update the application program being executed and to update the image projected onto the touch-sensitive display surface by the projector, if appropriate.

Unfortunately, interactive input systems that employ conventional projection units to project images onto display or interactive surfaces suffer from a number of problems including for example long startup time, limited bulb life and high power drain when the bulb is on. These projection units also provide little if any feedback to users concerning their state of operation (e.g., on standby, shutting down or warming up).

In order to improve the performance of projection units, various techniques have been considered. For example, U.S. Pat. No. 6,109,752 to Itoh, et al. discloses a lighting device that has two lamp units suitable for use in a projector-type display apparatus to realize bright illumination. The two lamp units and their integrator optical system enable an illumination area to be illuminated uniformly and evenly. The lamp units are arranged in parallel and in a direction perpendicular to a longitudinal direction of the illumination area.

U.S. Pat. No. 7,244,032 to Inamoto discloses a liquid crystal projector for full-color image projection. The projector includes three liquid crystal display (LCD) panels, each associated with a respective primary color. An ultra high pressure mercury lamp illuminates the LCD panels through three illuminating light paths associated with the primary colors. An auxiliary or laser illuminating device is also included. Light from the laser illuminating device is reflected by a mirror and introduced into the red color light path to compensate for shortage in light intensity in red color.

U.S. Pat. No. 6,467,911 to Ueyama, et al. discloses a projector having a liquid crystal display panel for displaying an image, a lamp for illuminating the liquid crystal display panel and a projection optical system for projecting light. The lamp is held by a member whose position is variable to allow fitting of different types of lamps and to allow the lamp to be moved to an optimum light-emission center position. The supply voltage of the lamp can be varied and controlled based on the input data related to the light-emission amount at different stages of the life of the lamp. An auxiliary lamp is provided so that the lamp that is lit can be switched to the auxiliary lamp as required.

U.S. Patent Application Publication No. 2009/0154153 to Lin discloses a light emitting diode (LED) projector lamp including a lamp holder, an LED light source, a light-mixing lens and a cover lens along an optical axis. The LED light source has LED chips arranged inside the lamp holder around the optical axis for emitting different wavelengths of light. The light-mixing lens has a structural surface with parallel lines of protrusions facing the cover lens such that emitted light rays of the LED chips that pass through the structural surface are scattered and then pass through the cover lens. As a result, the emitted different wavelengths of light from the LED light source are well mixed before going through the cover lens to the outside of the LED projector lamp, improving light uniformity and brightness in the projection zone.

While projection units have been designed to improve performance, further improvements are desired. It is therefore an object of the present invention at least to provide a novel projection unit and method for controlling the same.

SUMMARY OF THE INVENTION

Accordingly, in one aspect there is provided a projection unit comprising a first light source outputting light that is used to project an image during normal projection unit use and a second light source outputting light of a different intensity that is used to project an image outside of normal projection unit use.

In one embodiment, the second light source consumes less power during operation than the first light source. The second light source is operated to output light when the first light source is either warming up, cooling down or non-operational.

In one embodiment, the projection unit comprises at least one image panel configured to display the image. The image panel is illuminated by one of the first and second light sources thereby to project the image. The image comprises projection unit feedback information when the second light source illuminates the at least one image panel. When the first light source is warming up or cooling down, the feedback information comprises a countdown timer providing a running estimate of the time remaining for the first light source to warm up or cool down. When the second light source is non-operational, the feedback information comprises a warning identifying the non-operational state of the first light source. The feedback information may also comprise a prompt to condition the projection unit from a standby mode to a normal use mode. The prompt may be at least one of an icon and text.

According to another aspect there is provided a projection unit comprises a plurality of light sources, the light sources being configured to output light dependent on the operating mode of the projection unit.

In one embodiment, the intensity level of light output by each light source is different and only one light source is operational at a given time. The operating light source is selected based on the projection unit environment and is based on at least one of ambient light levels and room size.

According to yet another aspect there is provided a method of controlling a projection unit comprising conditioning a first light source to output light used to project an image during normal projection unit use and conditioning a second light source to output light used to project an image outside of normal projection unit use.

BRIEF DESCRIPTION OF THE DRAWINGS

Embodiments will now be described more fully with reference to the accompanying drawings in which.

DETAILED DESCRIPTION OF THE EMBODIMENTS

Figure 1:
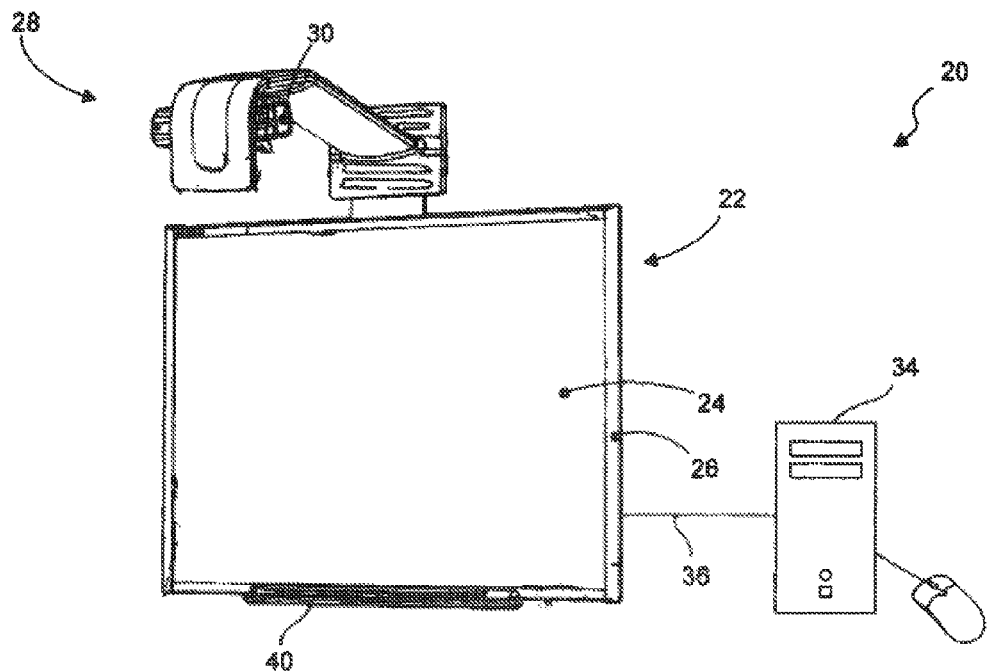
FIG. 1 is a partial perspective, schematic view of an interactive input system.
Figure 2:
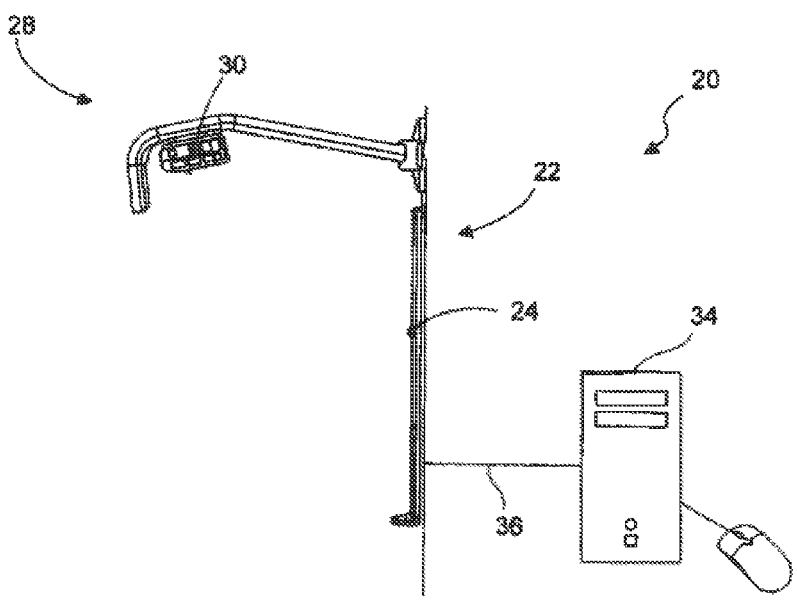
FIG. 2 is a side elevational view of the interactive input system of FIG. 1.

Turning now to FIGS. 1 and 2, an interactive input system that allows a user to inject input such as digital ink, mouse events, commands etc., into an executing application program is shown and is generally identified by reference numeral 20. In this embodiment, interactive input system 20 comprises an interactive board 22 mounted on a vertical support surface such as for example, a wall surface or the like. Interactive board 22 comprises a generally planar, rectangular interactive surface 24 that is surrounded about its periphery by a bezel 26. A boom assembly 28 is also mounted on the support surface above the interactive board 22. Boom assembly 28 provides support for a projection unit 30 that projects an image, such as for example a computer desktop, onto the interactive surface 24. The interactive board 22 communicates with a general purpose computing device 34 executing one or more application programs via a universal serial bus (USB) cable 36 or other suitable wired or wireless connection.

The interactive board 22 employs machine vision to detect one or more pointers brought into a region of interest in proximity with the interactive surface 24. General purpose computing device 34 processes the output of the interactive board 22 and adjusts image data that is output to the projection unit 30, if required, so that the image presented on the interactive surface 24 reflects pointer activity. In this manner, the interactive board 22, the general purpose computing device 34 and the projection unit 30 allow pointer activity proximate to the interactive surface 24 to be recorded as writing or drawing or used to control execution of one or more application programs executed by the general purpose computing device 34.

The bezel 26 in this embodiment is mechanically fastened to the interactive surface 24 and comprises four bezel segments that extend along the edges of the interactive surface 24. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces extend in a plane generally normal to the plane of the interactive surface 24.

A tool tray 40 is affixed to the interactive board 22 adjacent the bottom bezel segment using suitable fasteners such as for example, screws, clips, adhesive etc. As can be seen, the tool tray 40 comprises a housing that accommodates a master controller (not shown) and that has an upper surface configured to define a plurality of receptacles or slots. The receptacles are sized to receive one or more pen tools (not shown) as well as an eraser tool (not shown) that can be used to interact with the interactive surface 24. Control buttons (not shown) are provided on the upper surface of the housing to enable a user to control operation of the interactive input system 20. Further specifics of the tool tray 40 are described in U.S. patent application Ser. No. 12/709,424 to Bolt, et al., filed on Feb. 19, 2010, and entitled "Interactive. Input System and Tool Tray Therefor", assigned to SMART Technologies ULC, the content of which is incorporated herein by reference in its entirety.

Imaging assemblies (not shown) are accommodated by the bezel 26, with each imaging assembly being positioned adjacent a different corner of the bezel. Each of the imaging assemblies comprises an image sensor and associated lens assembly that provides the image sensor with a field of view sufficiently large as to encompass the entire interactive surface 24. A digital signal processor (DSP) or other suitable processing device sends clock signals to the image sensor causing the image sensor to capture image frames at the desired frame rate. During image frame capture, the DSP also causes an infrared (IR) light source to illuminate and flood the region of interest over the interactive surface 24 with IR illumination. Thus, when no pointer exists within the field of view of the image sensor, the image sensor sees the illumination reflected by the retro-reflective bands on the bezel segments and captures image frames comprising a continuous bright band. When a pointer exists within the field of view of the image sensor, the pointer occludes reflected IR illumination and appears as a dark region interrupting the bright band in captured image frames.

The imaging assemblies are oriented so that their fields of view overlap and look generally across the entire interactive surface 24. In this manner, any pointer such as for example a user's finger, a cylinder or other suitable object, or a pen or eraser tool lifted from a receptacle of the tool tray 48, that is brought into proximity of the interactive surface 24 appears in the fields of view of the imaging assemblies and thus, is captured in image frames acquired by multiple imaging assemblies. When the imaging assemblies acquire image frames in which a pointer exists, the imaging assemblies convey pointer data to the master controller which processes the pointer data before sending the pointer data to the computing device 34.

The general purpose computing device 34 in this embodiment is a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computer components to the processing unit. The general purpose computing device 34 may also comprise networking capabilities using Ethernet, WiFi, and/or other network formats, to enable access to shared or remote drives, one or more networked computers, or other networked devices. The computing device 34 processes pointer data received from the master controller and computes the location of any pointer in proximity to the interactive surface 24 using well known triangulation. The computer pointer location is then recorded as writing or drawings or used as an input command to control execution of an application program as described above.

Figure 3:
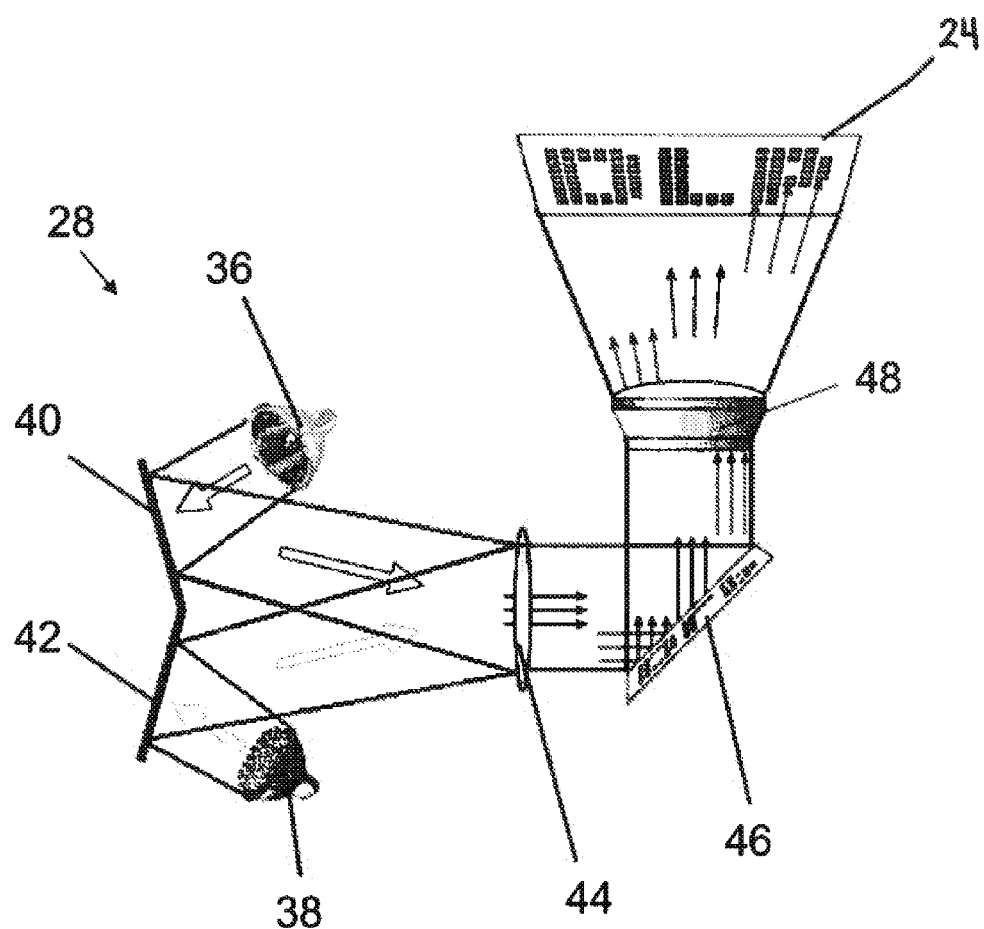
FIG. 3 is a partial perspective, schematic view of a projection unit forming part of the interactive input system of FIG. 1.

Turning now to FIG. 3, the projection unit 28 is better illustrated. As can be seen, the projection unit 28 comprises a conventional light source 36 and a low power light source 38. In this embodiment, the conventional light source 36 comprises an ultra high performance (UHP) lamp and the low power light source comprises a light emitting diode (LED) lamp. Light output by the conventional light source 36 is reflected by a mirror 40 towards a collimating lens 44 while light output by the low power light source 38 is reflected by a mirror 42 towards the collimating lens 44. Collimated light exiting the collimating lens 44 impinges on and illuminates an image panel 46. The image presented on the image panel 46 that is illuminated either by the conventional light source 36 or the low power light source 38 is in turn projected onto the interactive surface 24 via a projection lens 48.

The projection unit 28 operates in a plurality of modes, namely a warm up mode, a standby mode, a normal use mode and a cool down mode. The projection unit 28 enters the warm up mode when the projection unit is conditioned on for normal use. In the warm up mode, the low power light source 38 is in an on state, and thus, outputs light that illuminates the image panel 46. The conventional light source 36 is also powered but requires time to transition from an off state to an on state. Once the conventional light source 36 has transitioned to the on state, the projection unit 28 enters the normal use mode. In this mode, the light output by the conventional light source 36 illuminates the image panel 46 and the low power light source 38 is turned off. When the projection unit 28 is powered off, the projection unit 28 enters the cool down mode. In the cool down mode, as the conventional light source 36 transitions from the on state to the off state, the low power light source 38 is again powered and quickly assumes the on state thereby to illuminate the image panel 46. In the standby mode, the conventional light source 36 is in the off state and the low power light source 38 is in the on state.

As will be appreciated, when the conventional light source 36 is either off or is in transition between off and on states, the low power light source 38 is on allowing the projection unit 28 to project feedback information onto the interactive surface 24 concerning the operational state of the projection unit 28. Furthermore, since the projected feedback information is presented on the interactive board 22, the mode of operation of the projection unit 28 can be controlled by a user through interaction with the interactive surface 24.

Figure 4:
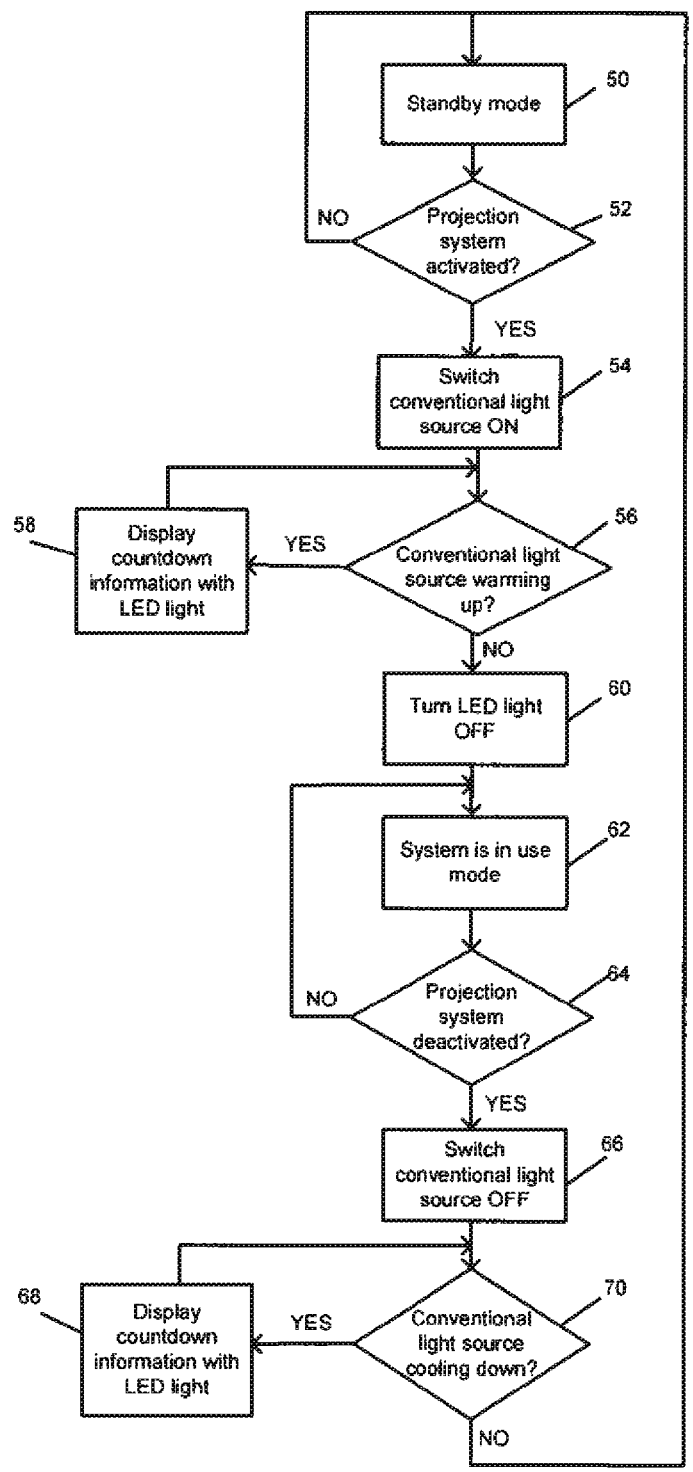
FIG. 4 is a flowchart showing the steps of a projection unit control method.
Figure 5:
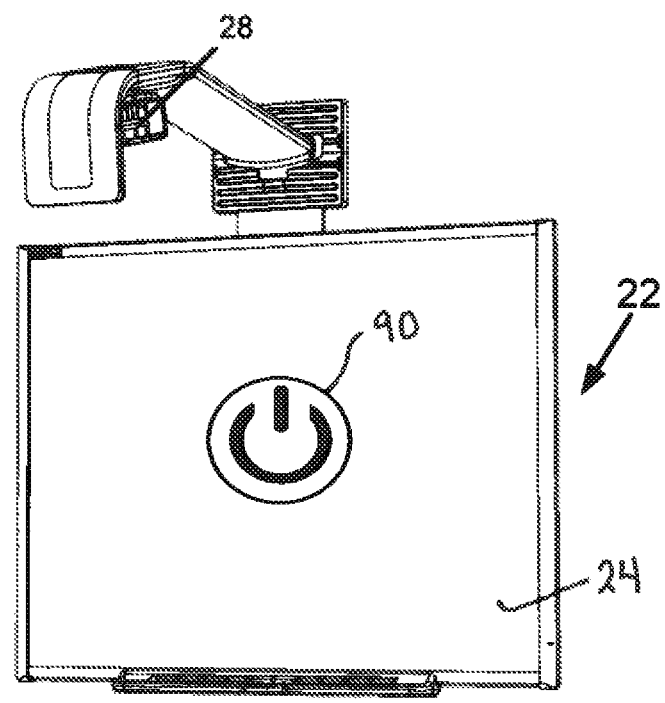
FIG. 5 shows exemplary feedback information in the form of a power button icon projected onto an interactive board forming part of the interactive input system of FIG. 1 by a low power light source of the projection unit when the projection unit is in a standby mode.
Figure 6:
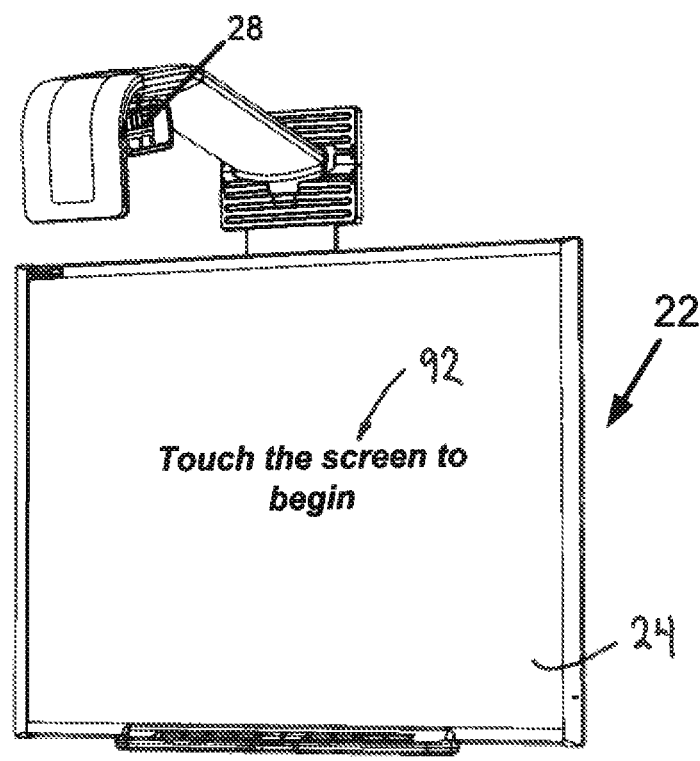
FIG. 6 shows alternative exemplary feedback information in the form of text projected onto the interactive board by the low power light source when the projection unit is in the standby mode.

Turning now to FIG. 4, a flowchart illustrating an exemplary method for controlling the projection unit 28 is shown. Initially, it is assumed that the projection unit 28 is in the standby mode (step 50). As mentioned previously, in the standby mode, the conventional light source 36 is in the off state and the low power light source 38 is in the on state. In this embodiment, while in the standby mode, the image panel 46 receives image data from the computing device 34 and in response displays an image of a power button icon. The light output by the low power light source 38 that is reflected by mirror 42 and collimated by lens 44 illuminates the image panel 46. As a result, the power button icon 90 is projected onto the interactive surface 24 as shown in FIG. 5. Alternatively, the image panel 46 may display text 92 that is projected onto the interactive surface 24 prompting a user to touch the interactive surface 24 as shown in FIG. 6. The projection unit 28 remains in the standby mode, until a touch contact is detected on the interactive surface 24 (step 52).

Figure 7:
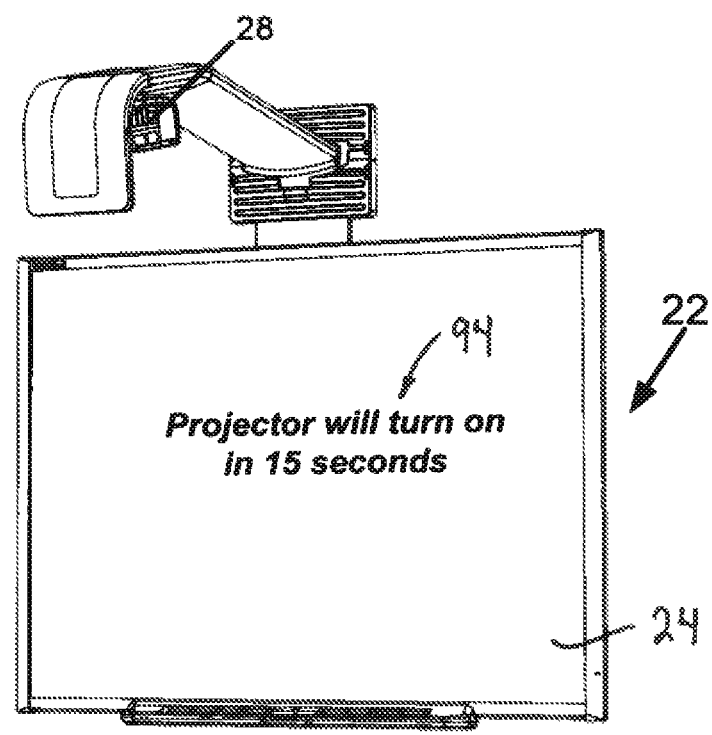
FIG. 7 shows exemplary feedback information in the form of text projected onto the interactive board by the low power light source when a conventional light source of the projection unit is warming up.

When a touch contact is made on the interactive surface 24 and is detected by the interactive board 22, the resulting pointer data received by the general purpose computing device 34 is processed and a control signal is sent from the computing device 34 to the projection unit 28 to condition the projection unit 28 to the warm up mode. As mentioned previously, in the warm up mode, the low power light source 38 remains on while the conventional light source 36 is powered and transitions from the off state to the on state (step 54). As is well known, the conventional light source 36 requires time to warm up before it can be used to project images onto the interactive surface 24. As the conventional light source 36 warms up (step 56), the image panel 46 receives image data from computing device 34 and in response displays feedback information in the form of a countdown timer. The light output by the low power light source 38 that illuminates the image panel 46 results in the countdown timer 94 being presented on the interactive surface 24 (step 58) as shown in FIG. 7. The countdown timer 94 provides a running estimate of the time remaining for the conventional light source 36 to assume the on state at which time, the projection unit 28 assumes the normal use mode. Once the conventional light source 36 has transitioned to the on state, the lower power light source 38 is turned off (step 60) and the projection unit 28 is deemed to have entered the normal use mode (step 62).

Figure 8:
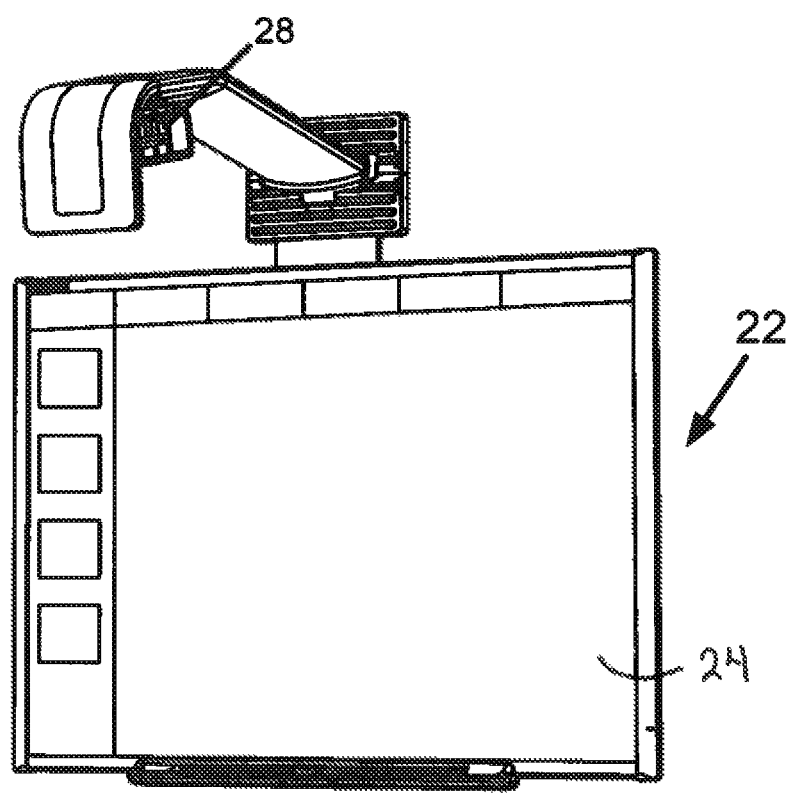
FIG. 8 shows an exemplary desktop image projected onto the interactive board by the conventional light source when the projection unit is in a normal use mode.

In the normal use mode (step 62), light output by the conventional light source 36 that is reflected by the mirror 40 and collimated by the lens 44 illuminates the image (typically a computer desktop) presented on the image panel 46. As a result, the image is projected onto the interactive surface 24 as illustrated in FIG. 8. In this manner, the user can interact with the displayed image. In this embodiment, the projection unit 28 remains in the normal use mode either until the projection unit 28 is switched off by a user or remains idle for a predetermined amount of time (step 64).

Figure 9:
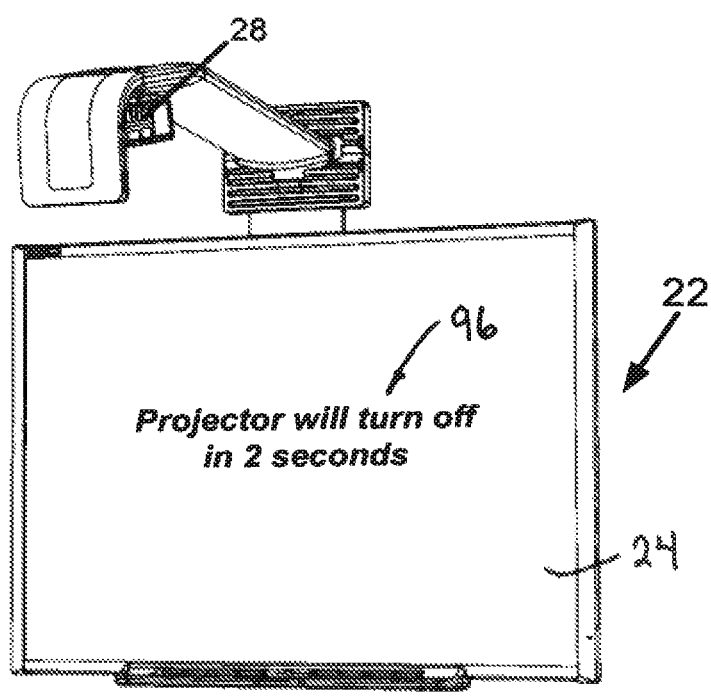
FIG. 9 shows exemplary feedback information in the form of text projected onto the interactive board by the low power light source when the conventional light source is cooling down.

When the projection unit 28 exits the normal use mode, either in response to user input or due to inactivity, a control signal is to the projection unit 28 by the computing device 34 which causes the projection unit 28 to enter the cool down mode. As mentioned previously, in the cool down mode, the low power light source 38 is powered and quickly assumes the on state and the conventional light source 36 is powered down. As is well known in the art, to prevent damage, the conventional light source 36 requires time to cool down before it completely powers down (step 66). As the conventional light source 36 cools down, feedback information in the form of a countdown timer is provided to the image panel 46 by the computing device 34 and displayed. The displayed countdown timer is illuminated by the light output by the low power light source 38 resulting in the countdown timer 96 being projected onto the interactive surface 24 as shown in FIG. 9. The countdown timer 96 provides a running estimate of the time remaining until the conventional light source 36 has completely shut down (step 68), that is, when the conventional light source 36 has cooled down to a suitable temperature in order to prevent lamp damage (step 68). Once the conventional light source 36 has completed cooling down (step 70), the projection unit 28 returns to the standby mode (step 50).

Figure 10:
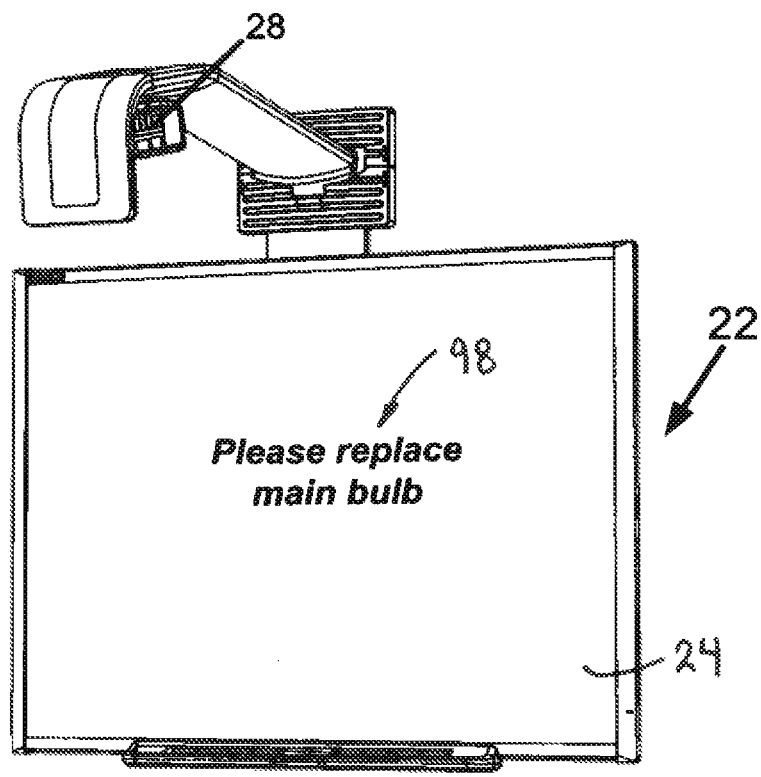
FIG. 10 shows exemplary feedback information in the form of text projected onto the interactive board by the low power light source when the conventional light source has burned out.

The low power light source 38 can also be used to illuminate the image panel 46 in order to project warnings onto the interactive surface 34 regarding the status of the conventional light source 36. For example, as shown in FIG. 10, in the event that the conventional light source 36 has burned out, the low power light source 38 can be is used to illuminate the image panel 46, which in this scenario displays feedback information in the form of text prompting the user to change the bulb of the conventional light source. As a result, the feedback information 98 is projected on the interactive surface 24.

As will be appreciated, when the projection unit 28 operates in the standby mode, both the conventional light source 36 and the low power light source 38 can be in the off state. In this case, no power button icon or text is projected onto the interactive surface 24 and the projection unit 28 remains in the off state until switched on by a user either via user interaction with the interactive surface 24 or via actuation of a manual power button. Once the projection unit 28 is switched on, the low power light source 38 is powered and quickly assumes the on state allowing feedback information displayed on the image panel 46 to be projected onto the interactive surface 24, as discussed above.

Figure 11:
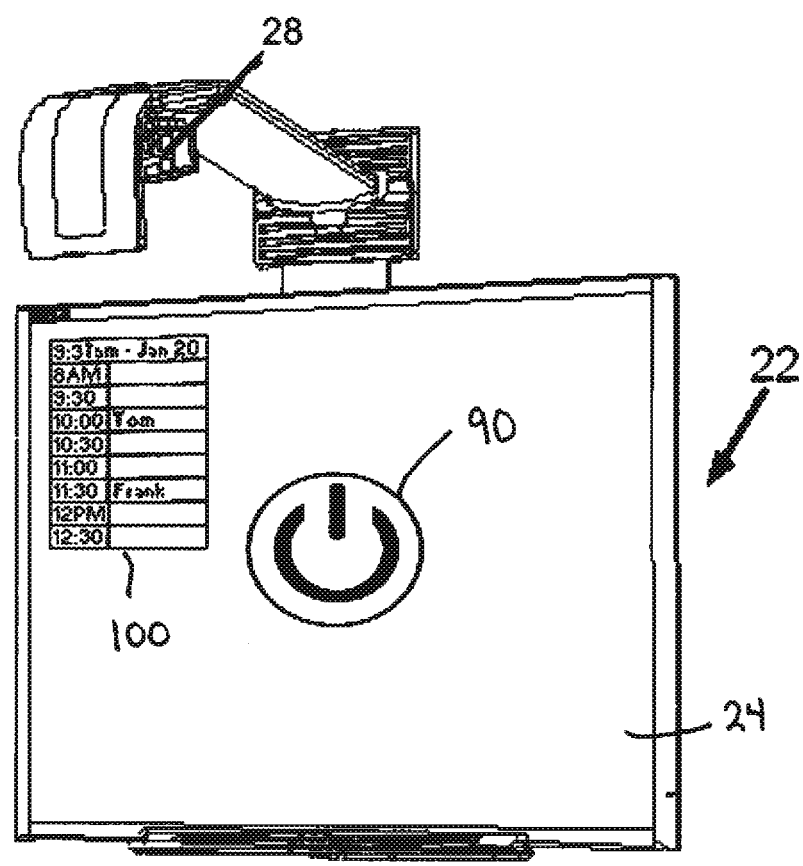
FIG. 11 shows alternative exemplary feedback information in the form of a power button icon and a meeting room schedule projected onto the interactive board by the low power light source when the projection unit is in the standby mode.

The low power light source 38 may be used to illuminate additional information that is displayed by the image panel 46 allowing that additional information to be projected onto the touch surface 24. For example, as shown in FIG. 11, the low power light source 38 is used to illuminate feedback information including the power button icon 90 as well as a meeting schedule 100 detailing the times a meeting room or classroom is booked for a given day, in which the interactive input system 20 is located, that is displayed on the image panel 46.

Figure 12:
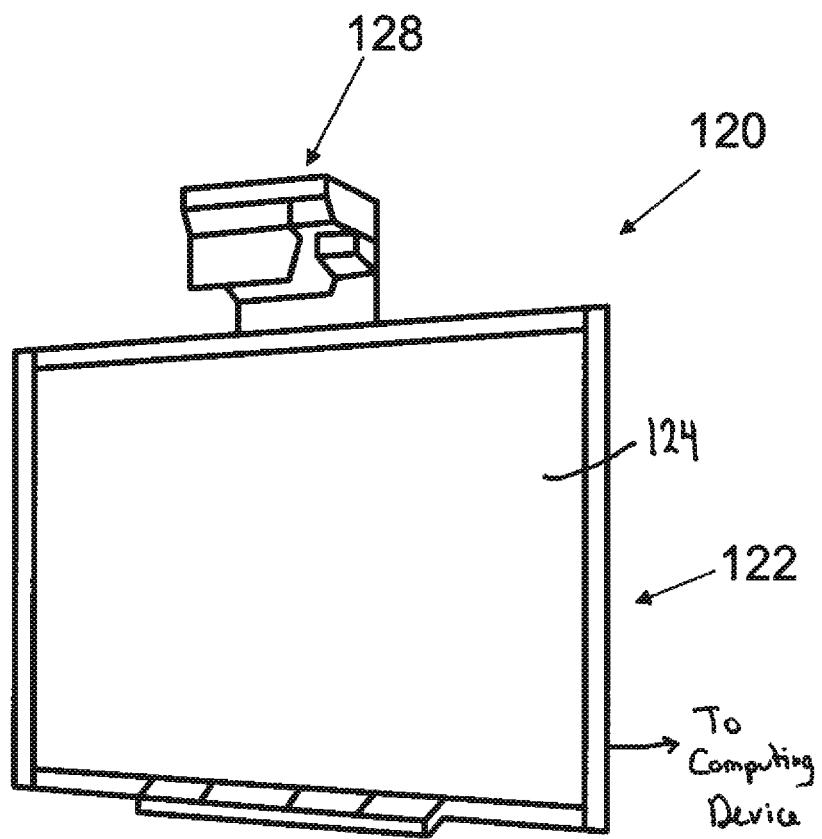
FIG. 12 is a perspective view of an alternative interactive input system.

Turning now to FIG. 12, another embodiment of an interactive input system is shown and is generally identified by reference numeral 120. In this embodiment, like reference numerals will be used to indicate like components with a "100" added for clarity. As can be seen, interactive input system 120 is similar to that of the first embodiment with the exception that the projection unit 128 is an ultra-short throw projection unit. As a result, the projection unit 128 is positioned a small distance away from the interactive board 122 obviating the need for the boom. In this embodiment, the light emitted by the low power light source of projection unit 128 results in a sharper and brighter image being projected onto the interactive surface 124 as compared to the previous embodiment, due to the fact that projection unit 128 is positioned closer to the interactive board 122.

Figure 13:
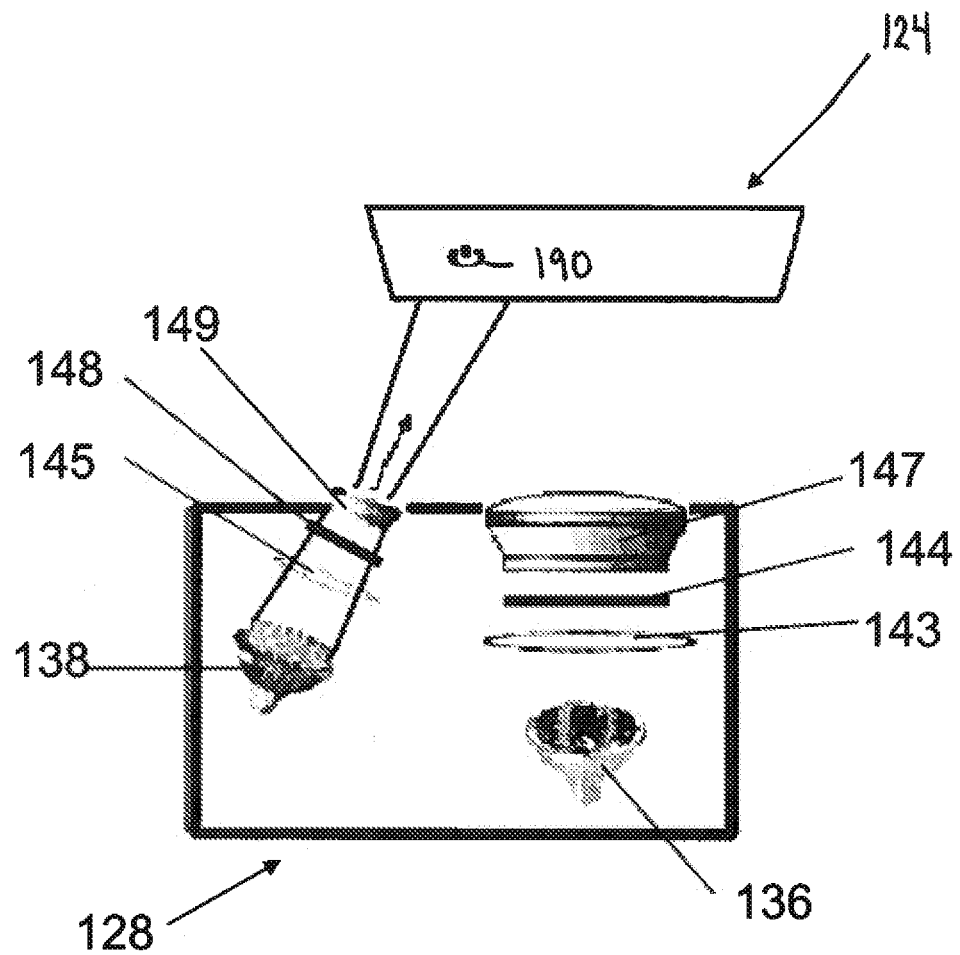
FIG. 13 is a partial perspective, schematic view of a projection unit forming part of the interactive input system of FIG. 12.
Figure 14:
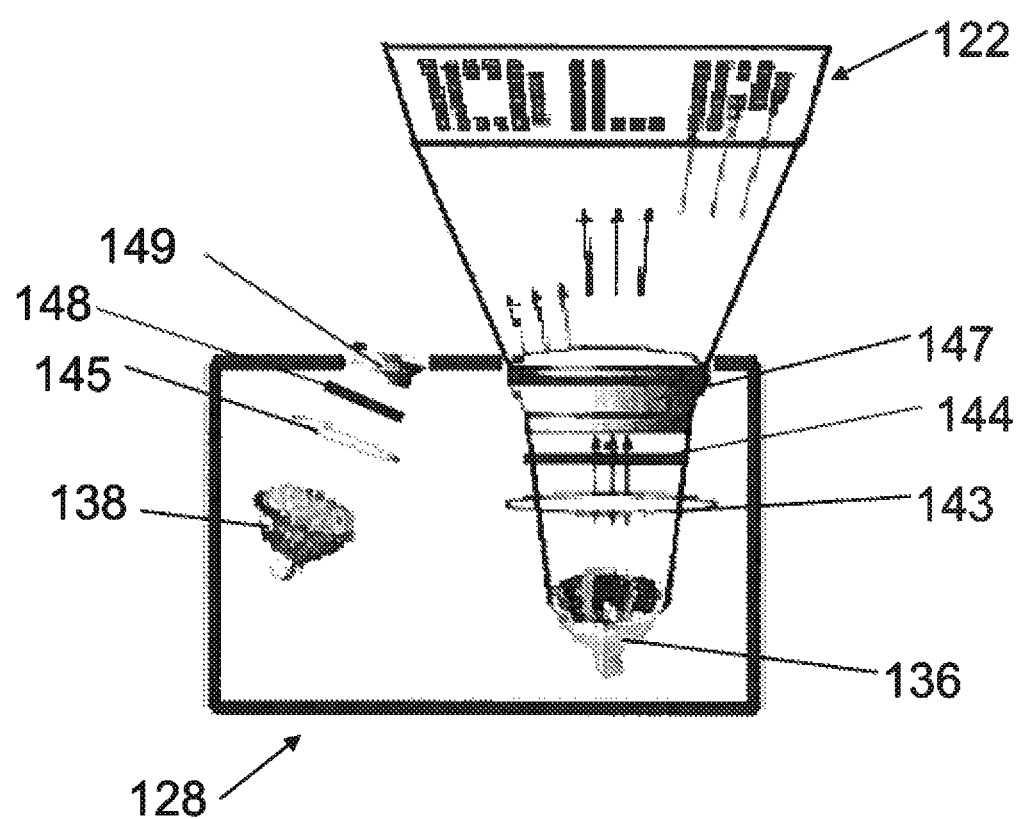
FIG. 14 is another partial perspective, schematic view of the projection unit of FIG. 12.

Turning now to FIGS. 13 and 14 an exemplary configuration for the projection unit 128 is shown. As can be seen, the conventional light source 136 and the low power light source 138 have separate optical paths. Light output by the conventional light source 136 is collimated by a lens 143 and illuminates an image panel 144 allowing the image displayed on the image panel 144 to be projected onto the interactive surface 124 via projection lens 147. Light output by the low power light source 138 is collimated by a lens 145 and illuminates an image panel 148 allowing the image displayed on the image panel 148 to be projected onto the interactive surface 124 via projection lens 149.

As shown in FIG. 13, and similar to the previous embodiment, when the projection unit 128 is in the standby mode, the low power light source 138 is used to illuminate the image panel 148 which displays feedback information in the form of a power button icon allowing the power button icon 190 to be projected onto the interactive surface 124.

As shown in FIG. 14, and similar to the previous embodiment, when the projection unit 128 is in the normal use mode, the conventional light source 136 is used to illuminate the image panel 144 which displays an image such as a computer desktop allowing the computer desktop to be projected on the interactive surface 24.

Figure 15A:
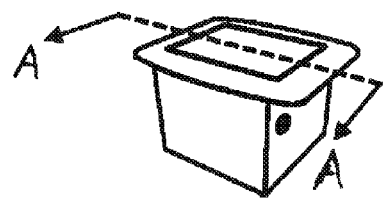
FIG. 15A is a perspective view of yet another embodiment of an interactive input system.
Figure 15B:
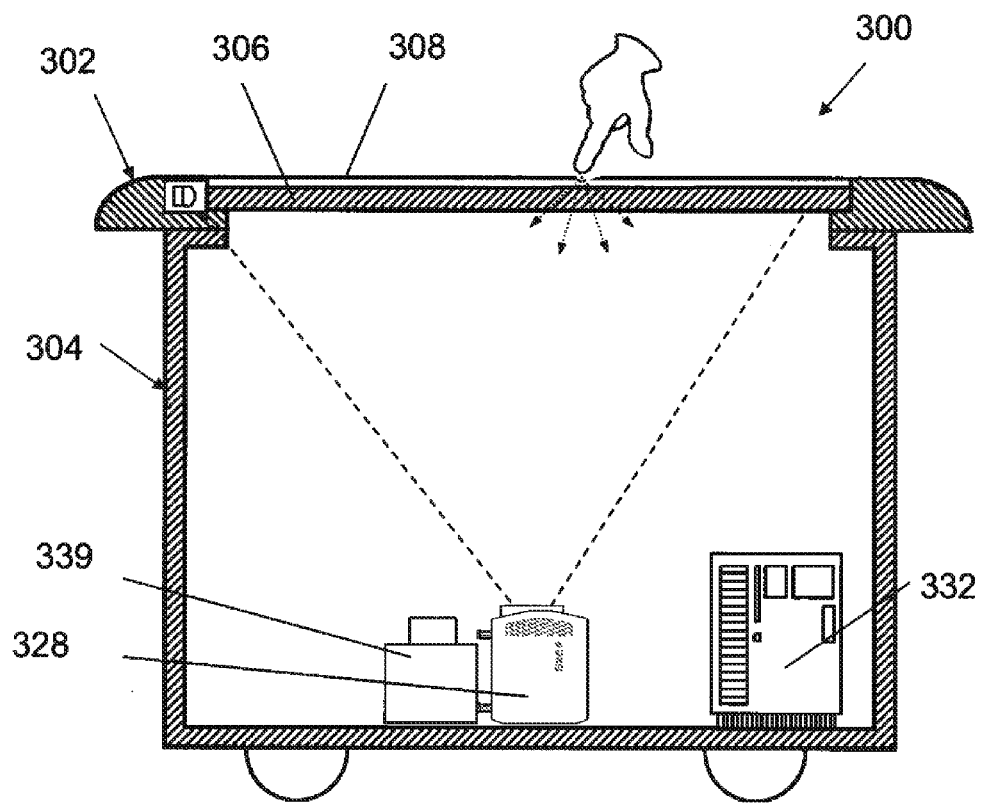
FIG. 15B is a cross-sectional view of FIG. 15A taken along line A-A.

FIGS. 15A and 15B show yet another embodiment of an interactive input system, and which is generally indicated by reference numeral 300. In this embodiment, interactive input system 300 is in the form of an interactive touch table similar to that described, for example, in U.S. Patent Application Publication No. 2010/0079409 to Sirotich, et al., entitled "Touch Panel For an Interactive Input System, and Interactive Input System Incorporating the Touch Panel", filed on Sep. 28, 2008, the entire content of which is fully incorporated herein by reference. Interactive input system 300 comprises a table top 302 mounted atop a cabinet 304. In this embodiment, cabinet 304 sits atop wheels, castors or the like that enable the interactive input system 300 to be easily moved from place to place as desired. Integrated into table top 302 is a coordinate input device in the form of a frustrated total internal reflection (FTIR) based touch panel 306 that enables detection and tracking of one or more pointers, such as fingers, pens, hands, cylinders, or other objects, applied thereto.

Cabinet 304 supports the table top 302 and touch panel 306, and houses a general purpose computing device 332, which executes a host application and one or more application programs. An imaging device 339 is installed within the cabinet 304 and is configured to capture images of the touch panel 306 and generate contact data when one or more pointers in contact with the touch panel appear in captured images. Contact data generated by the imaging device in turn is communicated to the general purpose computing device 332 via a USB cable or other suitable wired or wireless connection. Image data generated by the general purpose computing device is displayed on the touch panel 306 via projection unit 328 allowing a user to interact with the displayed image via pointer contacts on a display surface 308 of the touch panel 306. The projection unit 328 is similar to projection unit 28. In this manner, feedback information concerning the operational state of the projection unit 328 can be presented on the display surface 308 of the touch panel 306 as described above.

As will be appreciated, the projection unit may be used with other types of input systems, such as those described in above-incorporated U.S. Pat. Nos. 6,337,681; 6,747,636; 6,803,906; 7,232,986; 7,236,162; 7,274,356 and 7,532,206. Further, the projection unit may be used with input systems comprising touch panels employing analog resistive, electromagnetic, capacitive, acoustic or other technologies to register pointer input.

Although the conventional light source is described as comprising an ultra high performance (UHP) lamp, those skilled in the art would appreciate that other types of lamps may be used. For example, the conventional light source may comprise an ultra high efficiency (UHE) lamp or a metal halide lamp. The conventional light source may also be replaced by a different type of projector lamp such as a fluorescent lamp, a high power LED lamp, an incandescent lamp, etc., all of which consume more energy and emit more light than the LED low power light source.

Although the projection unit is described as having two light sources, those skilled in the art will appreciate that more light sources may be utilized. For example, the projection unit may comprise three or more light sources, with each of the light sources providing a different level of illumination dependent on the intensity of the projected image that is required. For example, if the projection unit is displaying simple information, a first light source consuming low power and emitting low intensity light may be used. If a presentation is being given in a small room, a second light source consuming higher power and emitting higher intensity light (compared to the first light source) may be used. If the projection unit is being used in a large room, a third light source consuming higher power and emitting higher intensity light (compared to the first and second light sources) may be used. The projection unit may also include a sensor to detect the intensity of ambient light in the room, and automatically select which light source to use based on the intensity of ambient light.

Although the low power light source is described as an LED lamp, those skilled in the art will appreciate that other types of low power light sources may be employed. For example, a laser light source may be used to illuminate the image panel when it displays feedback information that is to be projected onto the interactive surface.

Although embodiments have been described, those of skill in the art will appreciate that variations and modifications may be made without departing from the spirit and scope thereof as defined by the appended claims.

What is claimed is:

1. A projection unit comprising:
   a first light source outputting light that is used to project a first image during normal projection unit use; and
   a second light source outputting light of a different intensity that is used to project a second different image outside of normal projection unit use.

2. The projection unit of claim 1 wherein said second light source consumes less power during operation than said first light source.

3. The projection unit of claim 2 wherein said second light source is operated to output light at least when said first light source is one of warming up or cooling down.

4. The projection unit of claim 3 wherein said second light source is operated to output light at least when said first light source is warming up and cooling down.

5. The projection unit of claim 3 wherein said second light source is also operated to output light when said first light source is non-operational.

6. The projection unit of claim 4 wherein said second light source is also operated to output light when said first light source is non-operational.

7. The projection unit of claim 2 further comprising at least one image panel configured to display said first image when said at least one image panel is illuminated by said first light source and configured to display said second different image when said at least one image panel is illuminated by said second light source.

8. The projection unit of claim 7 wherein said second different image comprises projection unit feedback information.

9. The projection unit of claim 8 wherein said second light source is operated to output light at least when said first light source is one of warming up or cooling down.

10. The projection unit of claim 9 wherein said second light source is operated to output light at least when said first light source is warming up and cooling down.

11. The projection unit of claim 9 wherein said feedback information comprises a countdown timer providing a running estimate of the time remaining for said first light source to warm up or cool down.

12. The projection unit of claim 10 wherein said feedback information comprises a countdown timer providing a running estimate of the time remaining for said first light source to warm up or cool down.

13. The projection unit of claim 8 wherein said second light source is also operated to output light when said first light source is non-operational.

14. The projection unit of claim 13 wherein said feedback information comprises a warning identifying the non-operational state of the first light source.

15. The projection unit of claim 8 wherein said feedback information comprises a prompt to condition the projection unit from a standby mode to a normal use mode.

16. The projection unit of claim 15 wherein said prompt is at least one of an icon and text.

17. The projection unit of claim 2 wherein said second light source is one of a light emitting diode (LED) light source and a laser light source.

18. The projection unit of claim 2 wherein said first light source is one of a metal halide light source, an ultra high performance (UHP) lamp, an ultra high efficiency (UHE) lamp, a halogen lamp, a fluorescent lamp, a high power LED light source, and an incandescent lamp.

19. The projection unit of claim 7 comprising an image panel associated with each of said first and second light sources.

20. The projection unit of claim 19 wherein the second different image displayed by the image panel associated with the second light source comprises projection unit feedback information.

21. The projection unit of claim 20 wherein said second light source is operated to output light at least when said first light source is one of warming up or cooling down.

22. The projection unit of claim 21 wherein said second light source is operated to output light at least when said first light source is warming up and cooling down.

23. The projection unit of claim 21 wherein said feedback information comprises a countdown timer providing a running estimate of the time remaining for said first light source to warm up or cool down.

24. The projection unit of claim 22 wherein said feedback information comprises a countdown timer providing a running estimate of the time remaining for said first light source to warm up or cool down.

25. The projection unit of claim 21 wherein said second light source is also operated to output light when said first light source is non-operational.

26. The projection unit of claim 22 wherein said feedback information comprises a warning identifying the non-operational state of the first light source.

27. The projection unit of claim 20 wherein said feedback information comprises a prompt to condition the projection unit from a standby mode to a normal use mode.

28. The projection unit of claim 27 wherein said prompt is at least one of an icon and text.

29. A projection unit comprising:
a plurality of light sources, the light sources being configured to output light dependent on the operating mode of the projection unit, wherein one of said light sources is a primary light source configured to output light that is used to project a first image during normal projection unit use and wherein another of said light sources is a secondary light source that is conditioned to output light that is used to project a second different image when the primary light source is either warming up, cooling down or non-operational.

30. The projection unit of claim 29 wherein the intensity level of light output by each light source is different.

31. An interactive input system comprising:
a projection unit according to claim 1; and
an interactive surface on which said first image or second different image is projected.

32. The interactive input system of claim 31 further comprising processing structure responsive to said interactive surface and providing image data to said projector unit.

33. An interactive input system comprising:
a projection unit according to claim 29; and
an interactive surface on which said first image or second different image is projected.

34. The interactive input system of claim 33 further comprising processing structure responsive to said interactive surface and providing image data to said projector unit.

35. A method of controlling a projection unit comprising:
conditioning a first light source to output light used to project a first image during normal projection unit use; and
conditioning a second light source to output light used to project a second different image outside of normal projection unit use.

36. The method of claim 35 wherein the second light source is conditioned to output light when the first light source is either warming up, cooling down or non-operational.

37. The method of claim 35 further comprising projecting an image comprising feedback information representative of projection unit status when the second light source is conditioned to output light.

* * * * *